(12) United States Patent
Ito

(10) Patent No.: US 11,163,190 B2
(45) Date of Patent: Nov. 2, 2021

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Higashihiroshima (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/168,296

(22) Filed: Feb. 5, 2021

(65) Prior Publication Data
US 2021/0247644 A1    Aug. 12, 2021

(30) Foreign Application Priority Data
Feb. 6, 2020 (JP) .............................. JP2020-018473

(51) Int. Cl.
  *G02F 1/1335* (2006.01)
  *G03B 21/00* (2006.01)
  *G02F 1/1343* (2006.01)

(52) U.S. Cl.
  CPC .. *G02F 1/133526* (2013.01); *G02F 1/134309* (2013.01); *G03B 21/006* (2013.01); *G02F 2201/56* (2013.01)

(58) Field of Classification Search
  None
  See application file for complete search history.

(56) References Cited

U.S. PATENT DOCUMENTS

| 2015/0277187 A1* | 10/2015 | Akasaka | H04N 9/3152 |
| | | | 349/57 |
| 2015/0355502 A1 | 12/2015 | Ozawa | |
| 2016/0018568 A1 | 1/2016 | Ito et al. | |
| 2016/0097883 A1* | 4/2016 | Wakabayashi | G02B 3/0068 |
| | | | 349/57 |
| 2017/0176812 A1 | 6/2017 | Ozawa | |
| 2018/0173048 A1* | 6/2018 | Ito | G02F 1/1368 |

FOREIGN PATENT DOCUMENTS

| JP | 2015-230427 A | 12/2015 |
| JP | 2016-024207 A | 2/2016 |
| JP | 2016-075796 A | 5/2016 |
| JP | 2018-100994 A | 6/2018 |

* cited by examiner

*Primary Examiner* — Thanh Nhan P Nguyen
(74) *Attorney, Agent, or Firm* — Oliff PLC

(57) ABSTRACT

A second substrate of an electro-optical device is provided with a first curved surface. A first lens layer covers the first curved surface, and includes a second curved surface at a surface on an electro-optical layer side. A second lens layer covers the second curved surface, and includes a flat surface on the electro-optical layer side. A third lens layer includes a third curved surface on the electro-optical layer side. A fourth lens layer covers the third curved surface, and includes a fourth curved surface on the electro-optical layer side. A fifth lens layer covers the fourth curved surface. Between the second lens layer and the third lens layer, a light shielding member including a partition and a light shielding member for alignment is provided.

9 Claims, 11 Drawing Sheets

ELECTRO-OPTICAL DEVICE AND ELECTRONIC APPARATUS

The present application is based on, and claims priority from JP Application Serial Number 2020-018473, filed Feb. 6, 2020, the disclosure of which is hereby incorporated by reference herein in its entirety.

BACKGROUND

1. Technical Field

The present disclosure relates to an electro-optical device and an electronic apparatus.

2. Related Art

In a transmission-type electro-optical device to be used as, for example, a light valve of a projection-type display apparatus, an electro-optical layer is arranged between an element substrate provided with pixel electrodes and switching elements and a counter substrate provided with a common electrode. In the electro-optical device thus configured, the element substrate is provided with a light shielding member in a lattice shape, which includes wiring lines and the like, between a substrate body formed of a quartz substrate and the pixel electrodes. Only light that arrives at a light transmission area (pixel opening area) surrounded by the light shielding member contributes to display. In view of this, there has been proposed a structure in which two lenses overlap a substrate on a side that light from a light source enters and guide the light, which advances toward the light shielding member, to a light transmission area (JP-A-2016-75796). JP-A-2016-75796 discloses a structure in which an optical path length is optimized by providing a light transmission layer as a light path length adjustment layer between the two lenses. Further, JP-A-2016-75796 discloses a structure in which a lens layer provided on the substrate body side includes four layers and refractive indexes of the four layers are smaller from the substrate body side to the pixel electrodes.

In the structure described in JP-A-2016-75796, refraction at a boundary surface between the lens layer and the optical path length adjustment layer is utilized, and thus the optical path length adjustment layer is required. Further, refraction at the boundary surface between the lens layer and the optical path length adjustment layer cannot greatly deflect a light beam, and thus the optical path length is required to be increased by increasing a thickness of the optical path length adjustment layer. Therefore, it requires a long time period to form the light path length adjustment layer, which causes a problem of low productivity. Further, when the two lenses are provided in an overlapping manner, the two lenses are required to overlap each other at high accuracy. However, JP-A-2016-75796 does not at all describe a structure in which the two lenses overlap each other at high accuracy.

Therefore, in the structure described in JP-A-2016-75796, there is a problem in that reduction in thickness of a film formed on the substrate provided with the lenses or improvement of positioning accuracy between the lenses cannot be achieved.

SUMMARY

In order to solve the above-mentioned problem, an electro-optical device according to an aspect of the present disclosure includes a pair of substrates, and an electro-optical layer arranged between the pair of substrates, wherein one substrate of the pair of substrates includes a substrate body including a first curved surface concave toward a side opposite to the electro-optical layer, a first lens layer covering the first curved surface and including a second curved surface concave toward a side opposite to the electro-optical layer, the second curved surface being at a surface on a side of the electro-optical layer, a second lens layer covering the second curved surface and including a flat surface on a side of the electro-optical layer, a third lens layer being provided on a side of the electro-optical layer with respect to the second lens layer and including a third curved surface at a surface on a side of the electro-optical layer, a fourth lens layer covering the third curved surface from a side of the electro-optical layer, and a light shielding member provided between the second lens layer and the third lens layer, the substrate body and the first lens layer are different in refractive index, the first lens layer and the second lens layer are different in refractive index, and the third lens layer and the fourth lens layer are different in refractive index.

The electro-optical device according to the present disclosure can be used for various electronic apparatuses. When an electronic apparatus is a projection-type display apparatus, the electronic apparatus includes a light source unit configured to emit illumination light entering the electro-optical device, and a projection optical system configured to project modulated light emitted from the electro-optical device.

DESCRIPTION OF EXEMPLARY EMBODIMENTS

Figure 1:
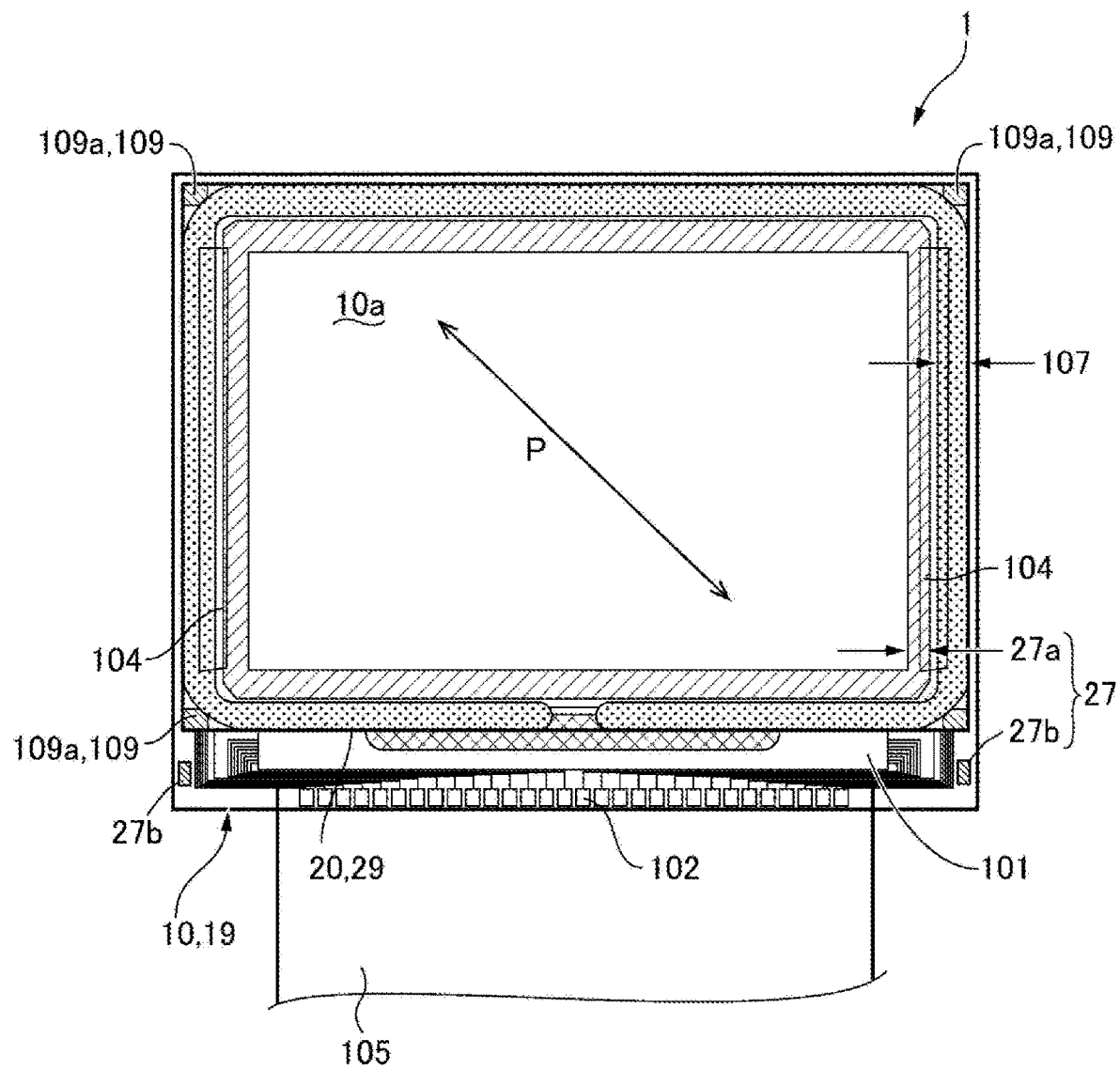
FIG. 1 is a plan view illustrating an electro-optical device to which an aspect of the present disclosure is applied.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Moreover, in the description described below, when a layer formed in a first substrate 10 is described, the upper layer side or the front surface side indicates the side (the side on which a second substrate 20 is positioned) opposite to the side on which a substrate body 19 is positioned, and the bottom layer side indicates the side on which the substrate body 19 is located.

Exemplary Embodiment 1

1. Overall Configuration

Figure 2:
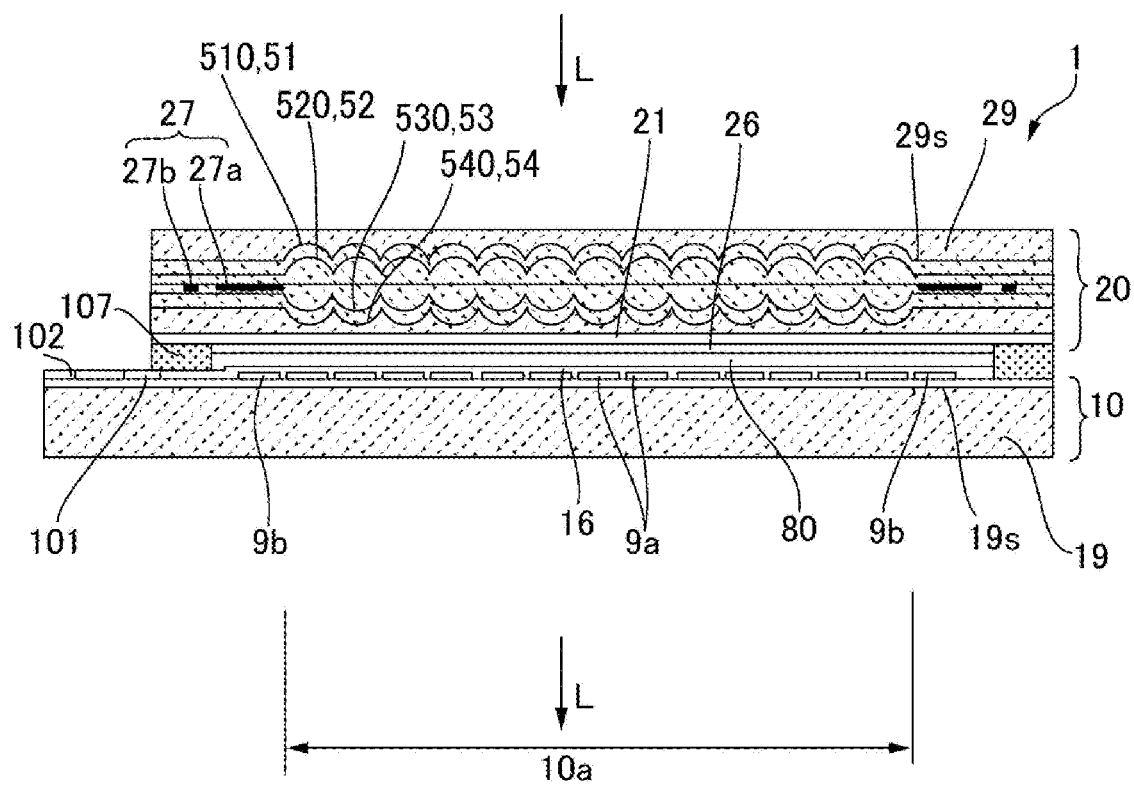
FIG. 2 is an explanatory view schematically illustrating a cross-sectional surface of the electro-optical device according to Exemplary Embodiment 1 of the present disclosure.
Figure 3:
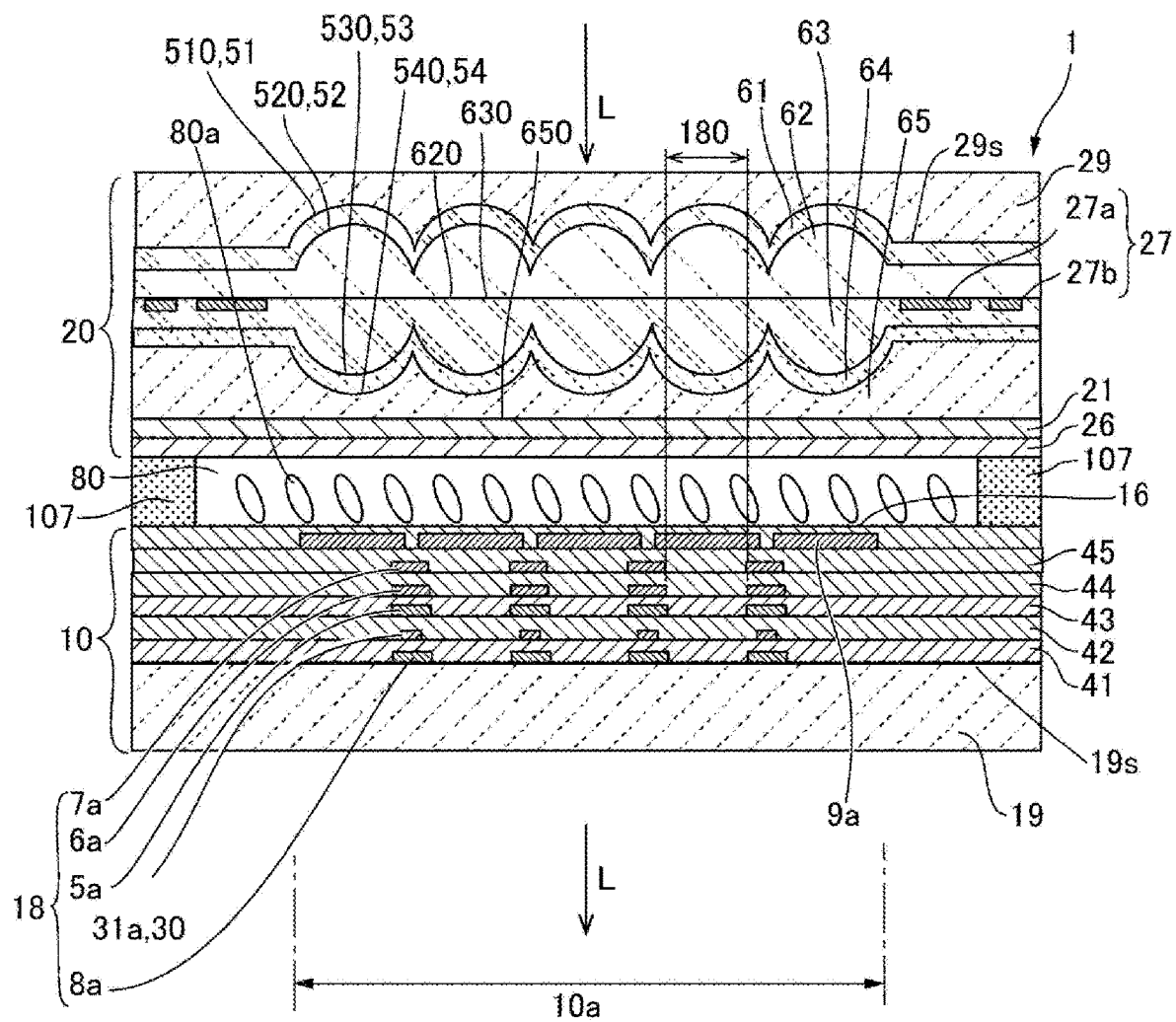
FIG. 3 is an explanatory view illustrating a part of the cross-sectional surface illustrated in FIG. 2 in an enlarged manner.

FIG. 1 is a plan view illustrating an electro-optical device 1 to which an aspect of the present disclosure is applied, and illustrates a state of the electro-optical device 1 viewed from the second substrate 20 side. FIG. 2 is an explanatory view schematically illustrating a cross-sectional surface of the electro-optical device 1 according to Exemplary Embodiment 1 of the present disclosure. FIG. 3 is an explanatory view illustrating a part of the cross-sectional surface illustrated in FIG. 2 in an enlarged manner.

As illustrated in FIG. 1, FIG. 2, and FIG. 3, in the electro-optical device 1, the first substrate 10 and the second substrate 20 are bonded together with a sealing material 107 creating a predetermined gap, where the first substrate 10 is opposed to the second substrate 20. The sealing material 107 is provided in a frame-like shape in conformance with the outer edge of the second substrate 20. An electro-optical layer 80 such as a liquid crystal layer is provided in an area surrounded by the sealing material 107 between the first substrate 10 and the second substrate 20. The sealing material 107 is a photocurable adhesive, or a photocurable and thermosetting adhesive, and a gap material such as glass fiber or glass beads for setting a distance between the substrates to a predetermined value is compounded in the sealing material 107. The first substrate 10 and the second substrate 20 both have a quadrangle shape, and in a substantially central portion of the electro-optical device 1, a display region 10a is provided as a quadrangle region. In accordance with such a shape, the sealing material 107 is also provided in a substantially quadrangular shape.

As a substrate body, the first substrate 10 includes a substrate body 19 such as a quartz substrate or a glass substrate. On one surface 19s side of the substrate body 19 on the second substrate 20 side, on an outer side of the display region 10a, a data line driving circuit 101 and a plurality of terminals 102 are formed along one side of the first substrate 10. A scan line driving circuit 104 is formed along other sides adjacent to the one side. A flexible wiring substrate 105 is coupled to the terminal 102, and various potentials and various signals are input to the first substrate 10 via the flexible wiring substrate. Further, on the one surface 19s of the substrate body 19, in the display region 10a, a plurality of pixel electrodes 9a having translucency and including an Indium Tin Oxide (ITO) film or the like, and pixel switching elements (not illustrated in FIG. 2) electrically coupled to the plurality of pixel electrodes 9a respectively are formed in a matrix pattern. A first oriented film 16 is formed on the second substrate 20 side with respect to the pixel electrodes 9a, and the pixel electrodes 9a are covered with the first oriented film 16. Therefore, the substrate body 19 to the first oriented film 16 correspond to the first substrate 10. The first substrate 10 includes dummy pixel electrodes 9b that are formed simultaneously with the pixel electrodes 9a in a region overlapping a partition 27a in plan view.

As a substrate body, the second substrate 20 includes a substrate body 29 such as a quartz substrate or a glass substrate. On one surface 29s side, which faces the first substrate 10, of the substrate body 29, a common electrode 21 having translucency and including an ITO film or the like is formed. A second oriented film 26 is formed on the first substrate 10 side with respect to the common electrode 21. The common electrode 21 is formed on a substantially entire surface of the substrate body 29, and is covered with the second oriented film 26. Therefore, the substrate body 29 to the second oriented film 26 corresponds to the second substrate 20.

A light shielding layer 27 formed of a resin, metal, or a metal compound is formed between the substrate body 29 and the common electrode 21. In the present exemplary embodiment, for example, the light shielding layer 27 includes the partition 27a in a frame-like shape extending along the outer peripheral edge of the display region 10a. However, in the second substrate 20, the light shielding layer 27 is not formed in the display region 10a.

The first substrate 10 includes an inter-substrate conduction electrode 109 being formed in a region positioning outside the sealing material 107 and overlapping a corner portion of the second substrate 20 such that electrical conduction is established between the first substrate 10 and the second substrate 20. An inter-substrate conduction material 109a including conductive particles is arranged in the inter-substrate conduction electrode 109. The common electrode 21 of the second substrate 20 is electrically coupled to the first substrate 10 side via the inter-substrate conduction material 109a and the inter-substrate conduction electrode 109. Therefore, a common potential is applied to the common electrode 21 from the first substrate 10 side.

The first oriented film 16 and the second oriented film 26 are inorganic oriented films such as oblique deposition films made of $SiO_x$ ($x<2$), $TiO_2$, MgO, or $Al_2O_3$, for example. Accordingly, the first oriented film 16 and the second oriented film 26 each include a columnar structure layer in which respective columnar bodies each named a column are diagonally formed with respect to both the first substrate 10 and the second substrate 20. Thus, in the first oriented film 16 and the second oriented film 26, liquid crystal molecules 80a having negative dielectric anisotropy and being used in the electro-optical layer 80 are oriented diagonally with respect to the first substrate 10 and the second substrate 20 to allow the liquid crystal molecules 80a to be pre-tilted. While no voltage is applied between the pixel electrode 9a and the common electrode 21, a pre-tilt angle denotes an angle formed between a vertical direction with respect to the first substrate 10 and the second substrate 20 and a long axis direction (orientation direction) of the liquid crystal molecules 80a. In the present exemplary embodiment, the pre-tilt angle is five degrees, for example.

In this way, the electro-optical device 1 is configured as an electro-optical device employing a Vertical Alignment (VA) mode. In the electro-optical device 1 thus configured, upon a voltage applied between the pixel electrode 9a and the common electrode 21, the liquid crystal molecules 80a are displaced to minimize the tilt angle with respect to the first substrate 10 and the second substrate 20. The direction of such a displacement corresponds to so-called a clear vision direction. In Exemplary Embodiment 1, as illustrated in FIG. 1, an orientation direction P (clear vision direction) of the liquid crystal molecules 80a corresponds to a direction in plan view from 04:30 toward 10:30 on a clock when the side to which the flexible wiring substrate is coupled corresponds to a direction at 06:00 on a clock.

In the electro-optical device 1 according to the present exemplary embodiment, the pixel electrodes 9a and the common electrode 21 are formed of a translucent conductive film such as an ITO film, and the electro-optical device 1 is constituted as a transmission-type liquid crystal device. In the transmission-type electro-optical device 1, light that entering the electro-optical layer 80 from any one of the first substrate 10 and the second substrate 20 is modulated while passing through the other substrate and being emitted. In this manner, an image is displayed. In the present exemplary embodiment, as indicated with the arrow L, the light entering the electro-optical layer 80 from the first substrate 10 side is modulated while passing through the second substrate 20 and being emitted. In this manner, an image is displayed. Therefore, the first substrate 10 is provided on a light incidence side, and the second substrate 20 on a light emission side faces the first substrate 10.

2. Specific Configuration Example of Pixel

Figure 4:
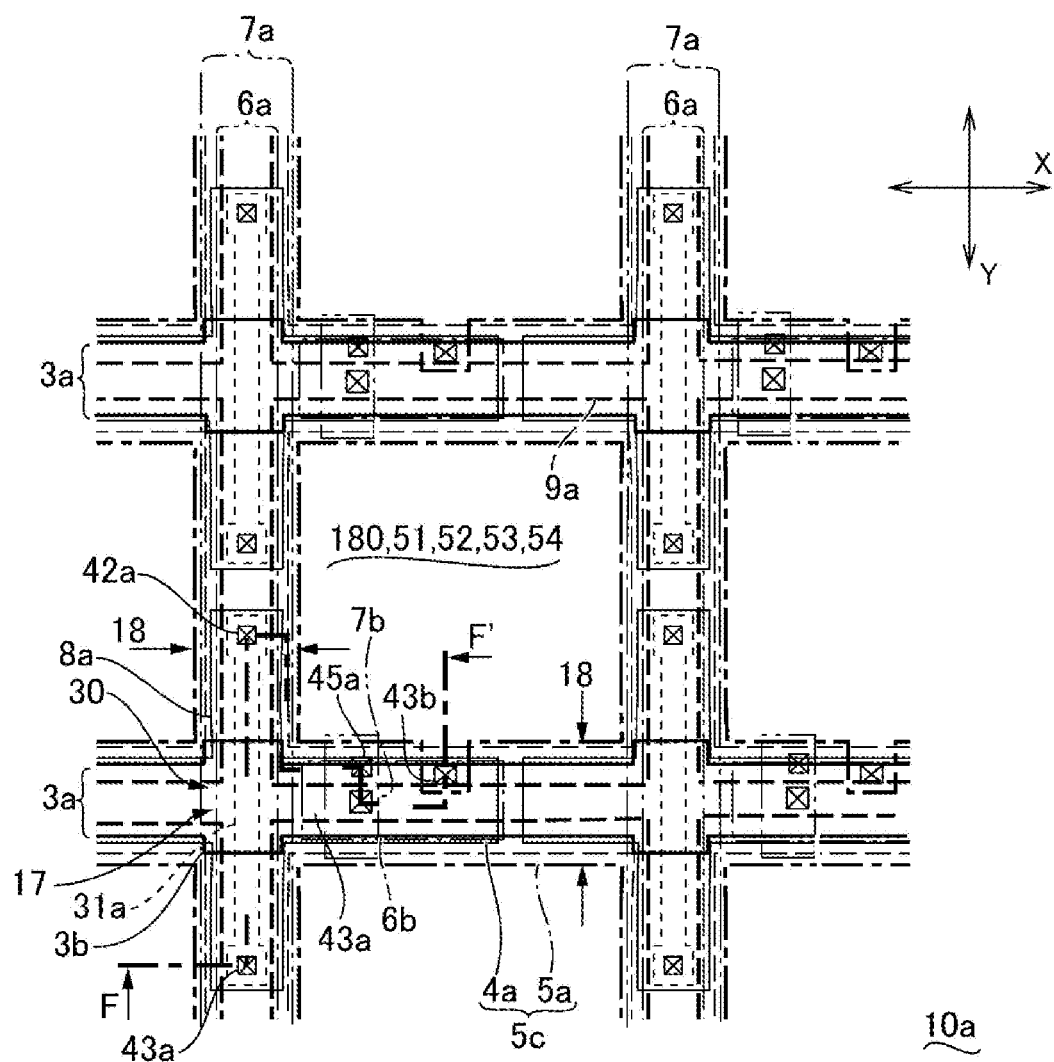
FIG. 4 is a plan view of a plurality of adjacent pixels on an electro-optical panel illustrated in FIG. 1.
Figure 5:
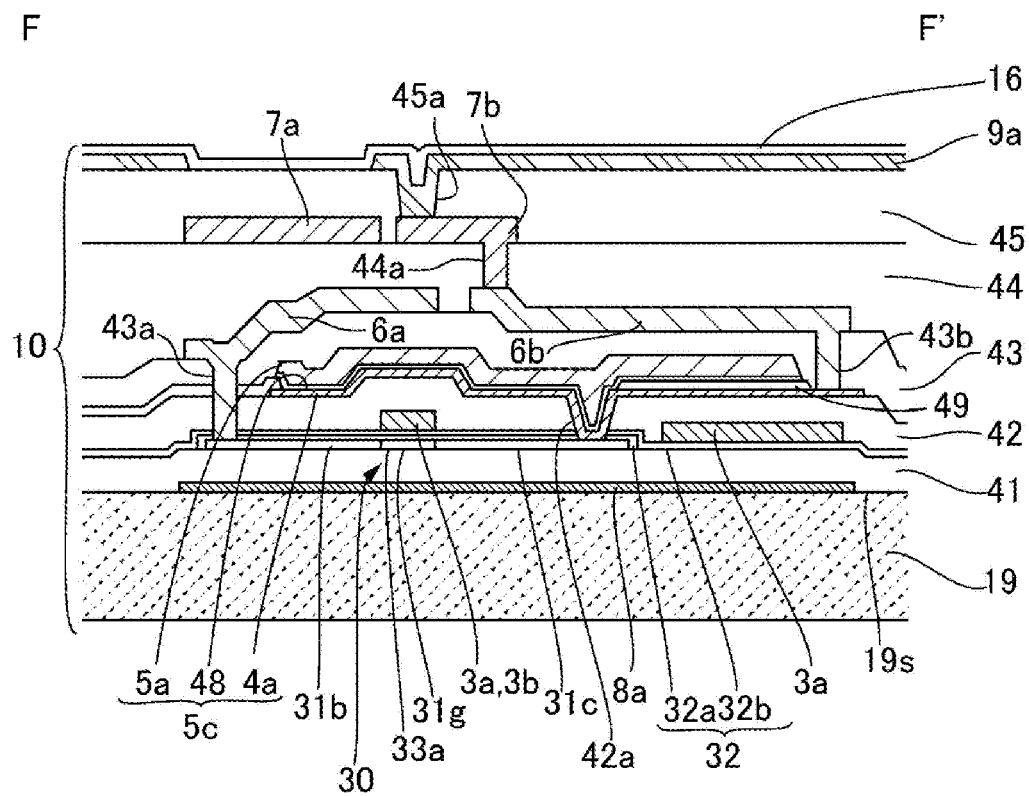
FIG. 5 is a cross-sectional view of the electro-optical panel, which is taken along the line F-F' illustrated in FIG. 4.

FIG. 4 is a plan view of a plurality of adjacent pixels on an electro-optical panel 100 illustrated in FIG. 1. FIG. 5 is a cross-sectional view of the electro-optical panel 100, which is taken along the line F-F' illustrated in FIG. 4. Note that, in FIG. 4, each layer is indicated by a line as described below. Further, as for the layers that have ends overlapping each other in plan view, the positions of the ends are deviated from one another in FIG. 4 for easy understanding of shapes and the like of the layers. Further, in FIG. 5, a contact hole 43a is illustrated at a deviated position.

A light shielding layer 8a: a thin and long dashed line
A semiconductor layer 31a: the thin and short dotted line
A scan line 3a: a thick solid line
A drain electrode 4a: a thin solid line
A data line 6a and a relay electrode 6b: a thin long dashed short dashed line
A capacitance line 5a: a thick long dashed short dashed line
A light shielding layer 7a and a relay electrode 7b: a thin long double-short dashed line
The pixel electrode 9a: a thick dashed line As illustrated in FIG. 4, at a surface facing of the first substrate 10, which faces the second substrate 20, the pixel electrode 9a is formed in each of the plurality of pixels, and the data lines 6a and the scan lines 3a are formed along inter-pixel regions each formed between the pixel electrodes 9a adjacent to each other. The inter-pixel regions extend lengthwise and crosswise. The scan lines 3a linearly extend along first inter-pixel regions of the inter-pixel regions, which extend in an X direction, and the data lines 6a linearly extend along second inter-pixel regions of the inter-pixel regions, which extend in a Y direction. Moreover, the switching elements 30 are formed in correspondence with intersections between the data lines 6a and the scan lines 3a, and in the present exemplary embodiment, the switching elements 30 are formed by utilizing intersection regions 17 between the data lines 6a and the scan lines 3a and vicinities of the intersection regions. The capacitance lines 5a are formed in the first substrate 10, and a common potential is applied to the capacitance lines 5a. The capacitance lines 5a extend to overlap the scan lines 3a and the data line 6a, and are formed to have a lattice shape. On the bottom layer side of the switching element 30, the light shielding layer 8a is formed, and the light shielding layer 8a extends to overlap the scan line 3a and the data line 6a. On the upper layer side of the switching element 30, the light shielding layer 7a is formed, and the light shielding layer 7a extends to overlap the data line 6a.

Therefore, in the display region 10a, between the substrate body 19 and the pixel electrode 9a, the first substrate 10 is provided with a light shielding member 18 in a lattice shape formed of the light shielding layer 8a, the scan line 3a, the capacitance line 5a, the data line 6a, and the light shielding layer 7a. In plan view, the light shielding member 18 extends between the adjacent pixel electrodes 9a. Therefore, only light passing through a light transmission area 180 surrounded by the light shielding member 18 contributes to display of an image.

As illustrated in FIG. 5, on the one surface 19s of the substrate body 19, which is positioned on the electro-optical layer 80 side, an inter-layer insulating film 41 is formed. Between the substrate body 19 and the inter-layer insulating film 41, the light shielding layer 8a is formed. The light shielding layer 8a is formed of a conductive film having a light shielding property, such as a metal silicide film, a metal film, and a metal compound film. The light shielding layer 8a extends along the scan line 3a and the data line 6a between the substrate body 19 and the switching element 30, and has an opening portion in a region overlapping the pixel electrode 9a in plan view. The light shielding layer 8a includes, for example, a light shielding film formed of tungsten silicide (WSi), tungsten, or titanium nitride, and prevents the light entering the first substrate 10 from entering a semiconductor layer 31a described later and causing an erroneous operation in the switching element 30 due to photoelectric current. The light shielding layer 8a may also be constituted as a scan line. In this case, a configuration described below in which a gate electrode 3b described later and the light shielding layer 8a are brought into conduction with each other is obtained.

On the upper layer side of the inter-layer insulating film 41, the switching element 30 including the semiconductor layer 31a is formed. The switching element 30 includes the semiconductor layer 31a including long sides oriented in an extending direction of the data line 6a, and the gate electrode 3b extending in a direction orthogonal to a longitudinal direction of the semiconductor layer 31a, and overlapping a central portion in the longitudinal direction of the semiconductor layer 31a. In the present exemplary embodiment, the gate electrode 3b includes a part of the scan line 3a. The switching element 30 includes a translucent gate insulating film 32 between the semiconductor layer 31a and the gate electrode 3b. The semiconductor layer 31a includes a channel region 31g facing the gate electrode 3b via the gate insulating film 32, and also includes a source region 31b and a drain region 31c on both sides of the channel region 31g, respectively. In the present exemplary embodiment, the switching element 30 has an LDD structure. Thus, on both the sides of the channel region 31g, each of the source region 31b and the drain region 31c has a low-concentration region. In a region adjacent to a side opposite to the channel region 31g with respect to the low-concentration region, each of the source region 31b and the drain region 31c has a high-concentration region.

The semiconductor layer 31a includes, for example, a polysilicon film. The gate insulating film 32 has a two-layer structure including a first gate insulating film 32a such as a silicon oxide film obtained by thermally oxidizing the semiconductor layer 31a, and a second gate insulating film 32b such as a silicon oxide film formed by using, for example, the low pressure CVD method. The gate electrode 3b and the scan line 3a each include a conductive film having a light shielding property, such as a metal silicide film, a metal film, and a metal compound film.

On an upper layer side of the gate electrode 3b, a translucent inter-layer insulating film 42 such as a silicon oxide film is formed. On an upper layer of the inter-layer insulating film 42, the drain electrode 4a is formed. The drain electrode 4a includes a conductive film having a light shielding property, such as a metal silicide film, a metal film, and a metal compound film. The drain electrode 4a is formed to have a part overlapping the drain region 31c of the semiconductor layer 31a, and is brought into conduction with the drain region 31c via a contact hole 42a passing through the inter-layer insulating film 41 and the gate insulating film 32.

On an upper layer side of the drain electrode 4a, a translucent etching stopper layer 49 such as a silicon oxide film and a translucent dielectric film 48 are formed. On an upper layer side of the dielectric film 48, the capacitance line 5a is formed. A silicon compound such as a silicon oxide film and a silicon nitride film may be used as the dielectric film 48. The capacitance line 5a includes a conductive film having a light shielding property, such as a metal silicide film, a metal film, and a metal compound film. The capacitance line 5a overlaps the drain electrode 4a via the dielectric film 48, and forms a retaining capacity 5c.

On an upper layer side of the capacitance line 5a, a translucent inter-layer insulating film 43 such as a silicon oxide film is formed. On an upper layer side of the inter-layer insulating film 43, the data line 6a and the relay electrode 6b are formed of the same conductive film. The data line 6a and the relay electrode 6b each include a conductive film having a light shielding property, such as a metal silicide film, a metal film, and a metal compound film. The data line 6a is brought into conduction with the source region 31b via the contact hole 43a passing through the inter-layer insulating film 43, the etching stopper layer 49, the inter-layer insulating film 42, and the gate insulating film 32. The relay electrode 6b is brought into conduction with the drain electrode 4a via a contact hole 43b passing through the inter-layer insulating film 43.

On an upper layer side of the data line 6a and the relay electrode 6b, a translucent inter-layer insulating film 44 such as a silicon oxide film is formed. On an upper layer side of the inter-layer insulating film 44, the light shielding layer 7a and the relay electrode 7b are formed. The light shielding layer 7a and the relay electrode 7b each include a conductive film having a light shielding property, such as a metal silicide film, a metal film, and a metal compound film. The relay electrode 7b is brought into conduction with the relay electrode 6b via the contact hole 44a passing through the inter-layer insulating film 44. The light shielding layer 7a is applied with a common potential, and also functions as a shielding layer. Note that the light shielding layer 7a may be configured as a capacitance line. The surface of the inter-layer insulating film 44 is flattened by subjecting the inter-layer insulating film 44 to Chemical Mechanical Polishing (CMP) processing or the like.

On the upper layer side of each of the light shielding layer 7a and the relay electrode 7b, a translucent inter-layer insulating film 45 such as a silicon oxide film is formed. On an upper layer side of the inter-layer insulating film 45, the pixel electrode 9a such as an ITO film is formed. A contact hole 45a reaching the relay electrode 7b is formed in the inter-layer insulating film 45. The pixel electrode 9a is electrically coupled to the relay electrode 7b via the contact hole 45a. As a result, the pixel electrode 9a is electrically coupled to the drain region 31c of the switching element 30 via the relay electrode 7b, the relay electrode 6b, and the drain electrode 4a. The surface of the inter-layer insulating film 45 is flattened by subjecting the inter-layer insulating film 45 to the CMP processing or the like. On a surface side of the pixel electrode 9a, the first oriented film 16 having translucency and including a polyimide or an inorganic oriented film is formed.

Note that a protective layer formed of boron-doped silicate glass (BSG film) may be formed between the inter-layer insulating film 45 and the pixel electrode 9a. Note that, inside the contact hole 45a, the pixel electrode 9a is electrically coupled to the relay electrode 7b on a bottom part of the contact hole 45a. Alternatively, there may be adopted a configuration in which the inside of the contact hole 45a is filled with a metal film such as tungsten as a plug and the pixel electrode 9a is electrically couped to the relay electrode 7b via the plug inside the contact hole 45a.

3. Configuration of Lenses in Second Substrate 20

In the electro-optical device 1 according to the present exemplary embodiment, a lens is formed in one substrate of the first substrate 10 and the second substrate 20. In the present exemplary embodiment and Exemplary Embodiments 2 and 3 described later, a lens is formed in the second substrate 20. In Exemplary Embodiments 4, 5, and 6 described later, a lens is formed in the first substrate 10. In the present exemplary embodiment, as illustrated in FIG. 3, in the display region 10a, four lens surfaces 51, 52, 53, and 54 are formed in the second substrate 20 in such a way to overlap each other in plan view, and each of the four lens surfaces 51, 52, 53, and 54 overlaps the pixel electrode 9a in plan view.

For achieving the configuration described above, in the second substrate 20, in the one surface 29s side of the substrate body 29, a first lens layer 61, a second lens layer 62, a third lens layer 63, a fourth lens layer 64, and a fifth lens layer 65 are sequentially provided from the substrate body 29 side to the electro-optical layer 80 side.

At a position overlapping the pixel electrode 9a in plan view in the one surface 29s of the substrate body 29, a first curved surface 510 concave toward a side opposite to the electro-optical layer 80 is provided. The first lens layer 61 covers the first curved surface 510, and a second curved surface 520 concave toward a side opposite to the electro-optical layer 80 is provided at a surface on the electro-optical layer 80 side. The second curved surface 520 is a concave portion to which the shape of the first curved surface 510 is reflected when the first lens layer 61 is formed. The second lens layer 62 covers the second curved surface 520, and includes a flat surface 620 on the electro-optical layer 80 side. The flat surface 620 is formed by subjecting the second lens layer 62 to the CMP processing or the like.

The third lens layer 63 directly overlaps the second lens layer 62. Therefore, the third lens layer 63 includes a flat surface 630 on a side opposite to the electro-optical layer 80, and includes a third curved surface 530 on the electro-optical layer 80 side, which overlaps the pixel electrode 9a in plan view. In the present exemplary embodiment, the third curved surface 530 is a convex curved surface protruding to the electro-optical layer 80 side. The fourth lens layer 64 covers the third curved surface 530, and a fourth curved surface 540 protruding to the electro-optical layer 80 side is provided at a surface on the electro-optical layer 80 side. The fourth curved surface 540 is a convex portion to which the shape of the third curved surface 530 is reflected when the fourth lens layer 64 is formed. The fifth lens layer 65 covers the fourth curved surface 540, and includes a flat surface 650 on the electro-optical layer 80 side. The flat surface 650 is formed by subjecting the fifth lens layer 65 to the CMP processing or the like.

Here, the substrate body 29 and the first lens layer 61 are different in refractive index, the first lens layer 61 and the second lens layer 62 are different in refractive index, the third lens layer 63 and the fourth lens layer 64 are different in refractive index, and the fourth lens layer 64 and the fifth lens layer 65 are different in refractive index. Therefore, the first curved surface 510, the second curved surface 520, the third curved surface 530, and the fourth curved surface 540 constitute the lens surfaces 51, 52, 53, and 54, respectively.

In the present exemplary embodiment, the substrate body 29 is a quartz substrate, and the fifth lens layer 65 is silicon oxide ($SiO_2$). Therefore, the substrate body 29 and the fifth lens layer 65 each have a refractive index of 1.48. The first lens layer 61, the second lens layer 62, the third lens layer 63, and the fourth lens layer 64 are silicon oxynitride (SiON), and silicon oxynitride has a refractive index ranging from 1.58 to 1.68. Therefore, the first lens layer 61, the second lens layer 62, the third lens layer 63, and the fourth lens layer 64 each have a refractive index larger than those of the substrate body 29 and the fifth lens layer 65. Further, silicon oxynitride has a larger refractive index as a nitrogen content is increased. Therefore, the first lens layer 61, the second lens layer 62, the third lens layer 63, and the fourth lens layer 64 are caused to have refractive indexes different from one another by differentiating nitrogen contents when silicon oxynitride is formed into a film.

In the present exemplary embodiment, the refractive indexes of the first lens layer 61, the second lens layer 62, the third lens layer 63, and the fourth lens layer 64 satisfy the following conditions.

the substrate body 29<the first lens layer 61
the first lens layer 61>the second lens layer 62
the third lens layer 63>the fourth lens layer 64>the fifth lens layer 65

Specifically, the first lens layer 61 is greater in refractive index than the substrate body 29. The first lens layer 61 is greater in refractive index than the second lens layer 62. The third lens layer 63 is greater in refractive index than the fourth lens layer 64. The fourth lens layer 64 is greater in refractive index than the fifth lens layer 65. Therefore, the lens surfaces 51, 53, and 54 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the second substrate 20 side is converged by the three lens surfaces 51, 53, and 54. When the illumination light enters the first substrate 10, light toward the light shielding member 18 can be guided efficiently to the light transmission area 180. Thus, an amount of light emitted from the electro-optical device 1 can be increased, and hence a bright image can be displayed. Further, illumination light is converged by the three lens surfaces 51, 53, and 54. Thus, there is no need to provide a thick optical path length adjustment layer that is referred to as a path layer for adjusting an optical path length in the second substrate 20. Therefore, the total thickness of the second substrate 20 from the substrate body 29 to the common electrode 21 can be set to 20 μm or smaller, for example. Therefore, a time period required for forming a film can be shortened, and hence productivity can be improved.

Further, the lens surface 52 has a negative power, and hence a situation in which illumination light focuses on the electro-optical layer 80 or the like can be avoided.

Further, the first lens layer 61 is provided in conformity with the shape of the first curved surface 510 of the substrate body 29, and thus the lens surface 52 is formed between the first lens layer 61 and the second lens layer 62. The fourth lens layer 64 is provided in conformity with the shape of the third curved surface 530 of the third lens layer 63, and thus the lens surface 54 is formed between the third lens layer 63 and the fourth lens layer 64. In this regard, the thicknesses of the first lens layer 61 and the fourth lens layer 64 can be reduced. Therefore, a time period required for forming a film can be shortened, and hence productivity can be improved.

4. Configuration of Light Shielding Layer 27

In the present exemplary embodiment, the second lens layer 62 includes the flat surface 620 on the electro-optical layer 80 side, and hence the light shielding layer 27 is provided between the second lens layer 62 and the third lens layer 63. More specifically, the light shielding layer 27 is provided on the flat surface 620 of the second lens layer 62 on the electro-optical layer 80 side, and is held in contact with the flat surface 620. In this structure, the light shielding layer 27 includes the partition 27a, and also includes a light shielding layer 27b for alignment, which is provided outside the display region 10a. Therefore, in a process of forming the third curved surface 530, when a photoresist is exposed with light through use of a photolithography technique, an exposure mask can be positioned with the light shielding layer 27b for alignment as a reference. Further, the partition 27a is provided between the second lens layer 62 and the third lens layer 63, and hence there is no need to perform a process of providing a partition between the fifth lens layer 65 and the common electrode 21.

5. Method of Manufacturing Second Substrate 20

In a process of manufacturing the second substrate 20 illustrated in FIG. 3, first, a resist mask including an opening portion is formed on the substrate body 29. After that, isotropic etching is performed through the opening portion, and thus the first curved surface 510 is formed.

Subsequently, the first lens layer 61 and the second lens layer 62 are sequentially formed. After that, the surface of the second lens layer 62 is flattened by the CMP processing or the like, and the flat surface 620 is formed. Subsequently, the light shielding layer 27 is formed in the flat surface 620 of the second lens layer 62.

Subsequently, the third lens layer 63 is formed. After that, dry etching is performed under a state in which a resist mask having a predetermined shape is formed on the surface of the third lens layer 63, and the shape of the resist mask is transferred onto the surface of the third lens layer 63.

Subsequently, the fourth lens layer 64 and the fifth lens layer 65 are formed. After that, the surface of the second lens layer 62 is flattened by the CMP processing or the like, and the flat surface 650 is formed. Next, the common electrode 21 and the second oriented film 26 are formed.

Modified Example 1 of Exemplary Embodiment 1

The first lens layer 61, the second lens layer 62, the third lens layer 63, the fourth lens layer 64, and the fifth lens layer 65 may satisfy the following conditions, for example. In this case, the third curved surface 530 constitutes a lens having a negative power.

the substrate body 29<the first lens layer 61
   the first lens layer 61>the second lens layer 62>the third lens layer 63
   the third lens layer 63<the fourth lens layer 64
   the fourth lens layer 64>the fifth lens layer 65

Exemplary Embodiment 2

Figure 6:
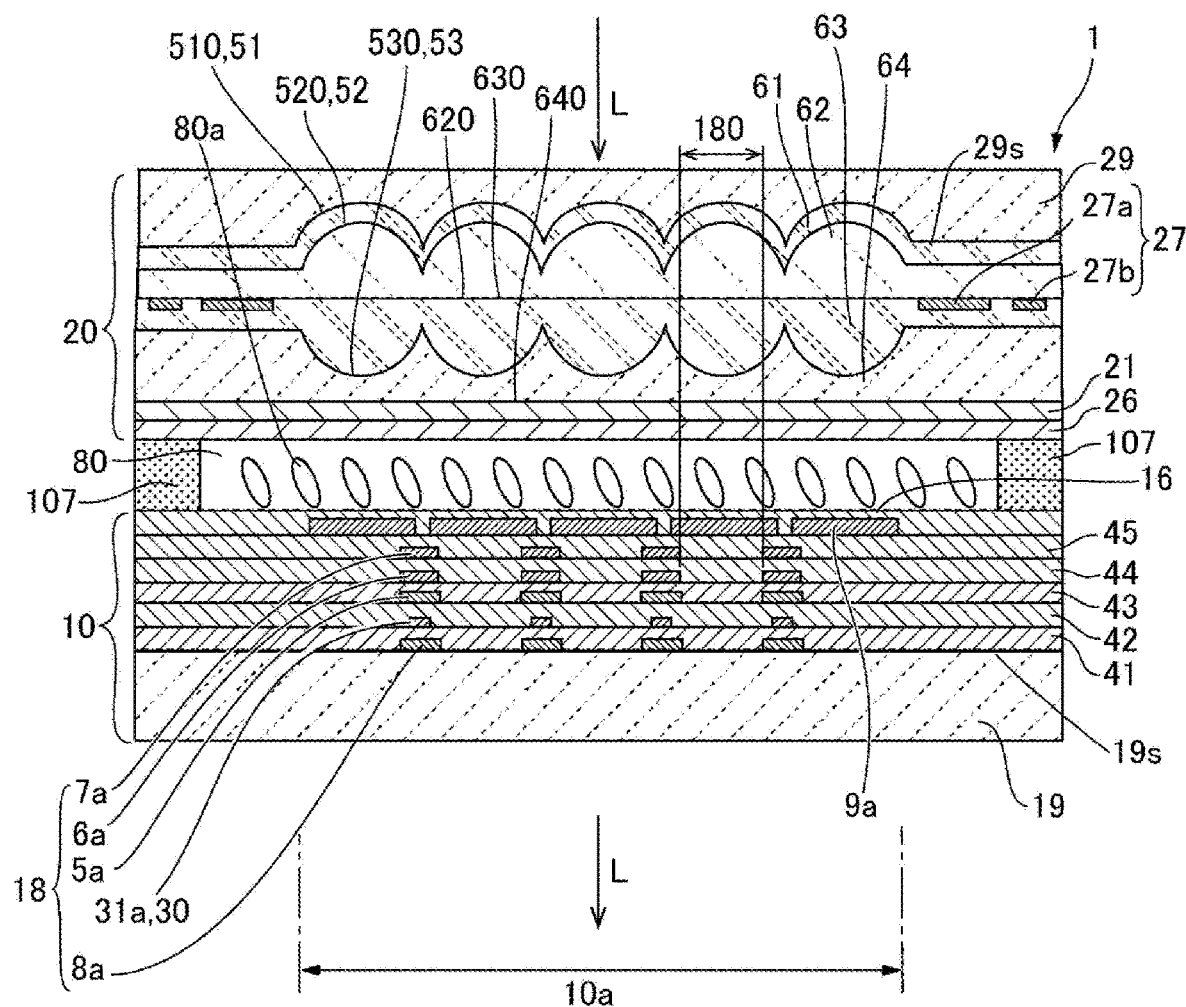
FIG. 6 is an explanatory view of an electro-optical device according to Exemplary Embodiment 2 of the present disclosure.

FIG. 6 is an explanatory view of the electro-optical device 1 according to Exemplary Embodiment 2 of the present disclosure. Note that the basic configurations of the present exemplary embodiment and the exemplary embodiments described later are the same as that of Exemplary Embodiment 1. Thus common portions have the same reference symbols, and description of the common portions will be omitted.

In Exemplary Embodiment 1, the five lens layers constitute the four lens surfaces. In the present exemplary embodiment, as described below, four lens layers constitute three lens surfaces. Specifically, as illustrated in FIG. 6, in the second substrate 20, in the one surface 29s side of the substrate body 29, the first lens layer 61, the second lens layer 62, the third lens layer 63, and the fourth lens layer 64 are sequentially provided from the substrate body 29 side to the electro-optical layer 80.

In the one surface 29s of the substrate body 29, the first curved surface 510 concave toward the side opposite to the electro-optical layer 80 is provided. The first lens layer 61 covers the first curved surface 510, and the second curved surface 520 concave toward the side opposite to the electro-optical layer 80 is provided in the surface on the electro-optical layer 80 side. The second lens layer 62 covers the second curved surface 520, and includes the flat surface 620 on the electro-optical layer 80 side. The third lens layer 63 overlaps the second lens layer 62. The third lens layer 63 includes the third curved surface 530 on the electro-optical layer 80 side. In the present exemplary embodiment, the third curved surface 530 is a convex curved surface protruding to the electro-optical layer 80 side. The fourth lens layer 64 covers the third curved surface 530, and includes a flat surface 640 on the electro-optical layer 80 side. The flat surface 620 is formed by subjecting the second lens layer 62 to the CMP processing or the like, and the flat surface 640 is formed by subjecting the fourth lens layer 64 to the CMP processing or the like. In the present exemplary embodiment, on the flat surface 620 of the second lens layer 62 on the electro-optical layer 80 side, the light shielding layer 27 including the partition 27a and the light shielding layer 27b for alignment is provided. The light shielding layer 27 is held in contact with the flat surface 620. Therefore, between the second lens layer 62 and the third lens layer 63, the light shielding layer 27 including the partition 27a and the light shielding layer 27b for alignment is provided.

Here, the refractive indexes of the substrate body 29, the first lens layer 61, the second lens layer 62, the third lens layer 63, and the fourth lens layer 64 satisfy the following conditions.

the substrate body 29<the first lens layer 61
   the first lens layer 61>the second lens layer 62
   the third lens layer 63>the fourth lens layer 64

Specifically, the first lens layer 61 is greater in refractive index than the substrate body 29. The first lens layer 61 is greater in refractive index than the second lens layer 62. The third lens layer 63 is greater in refractive index than the fourth lens layer 64. Therefore, the lens surfaces 51 and 53 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the second substrate 20 side is converged by the two lens surfaces 51 and 53. When the illumination light enters the first substrate 10, light toward the light shielding member 18 can be guided efficiently to the light transmission area 180. Thus, an amount of light emitted from the electro-optical device 1 can be increased, and hence a bright image can be displayed. Further, illumination light is converged by the two lens surfaces 51 and 53. Thus, there is no need to provide a thick optical path length adjustment layer that is referred to as a path layer for adjusting an optical path length in the second substrate 20. Therefore, the total thickness of the second substrate 20 from the substrate body 29 to the common electrode 21 can be set to 20 μm or smaller, for example. Therefore, a time period required for forming a film can be shortened. Thus, an effect such as improvement in productivity and the like can be exerted similarly in Exemplary Embodiment 1.

Exemplary Embodiment 3

Figure 7:
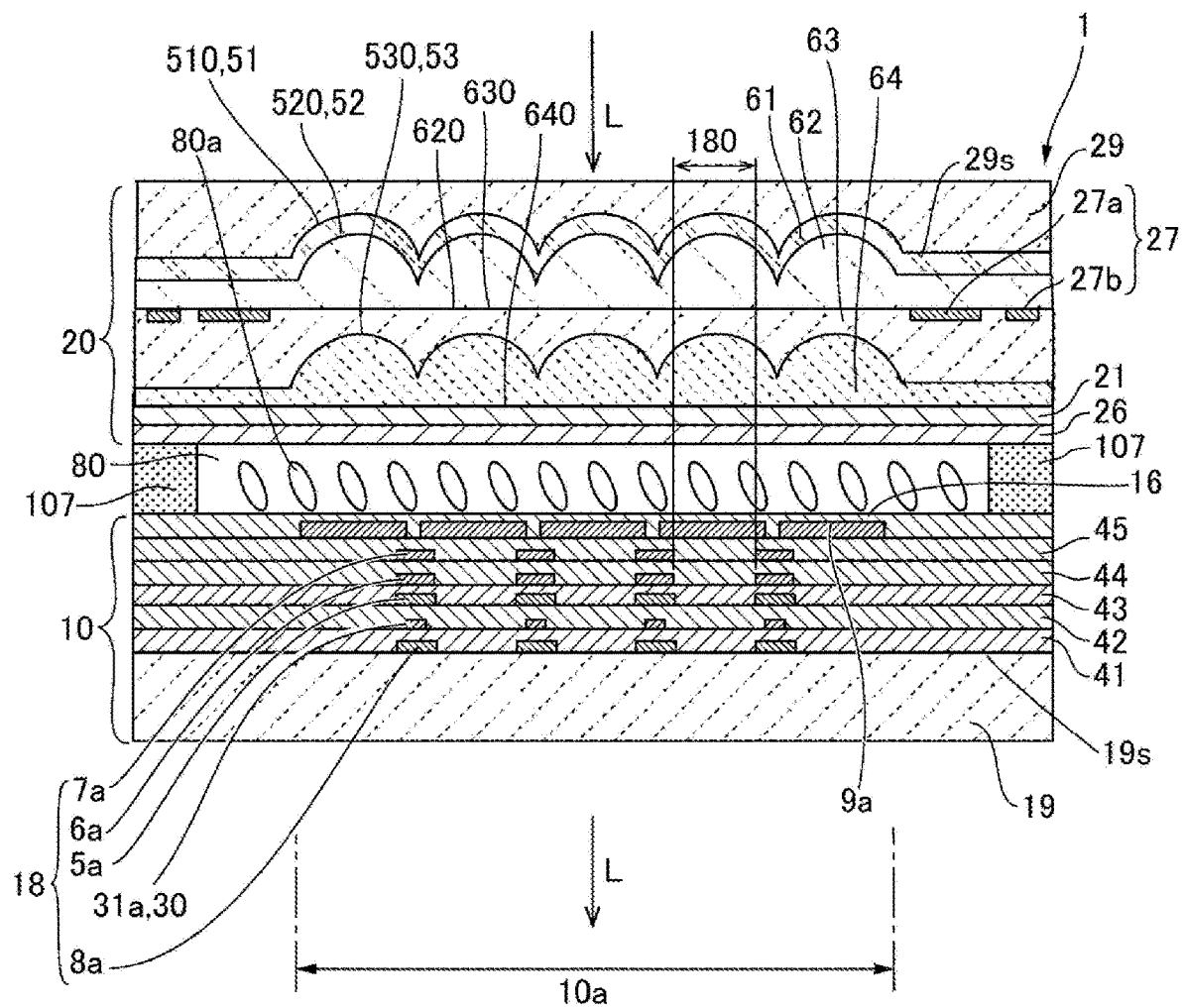
FIG. 7 is an explanatory view of an electro-optical device according to Exemplary Embodiment 3 of the present disclosure.

FIG. 7 is an explanatory view of the electro-optical device 1 according to Exemplary Embodiment 3 of the present disclosure. In Exemplary Embodiment 2, the third curved surface 530 is a convex curved surface protruding to the electro-optical layer 80. In the present exemplary embodiment, as illustrated in FIG. 7, the third curved surface 530 is a concave curved surface concave toward the substrate body 29. More specifically, as illustrated in FIG. 7, in the second substrate 20, on the one surface 29s side of the substrate body 29, the first lens layer 61, the second lens layer 62, the third lens layer 63, and the fourth lens layer 64 are sequentially provided from the substrate body 29 side to the electro-optical layer 80.

In the one surface 29s of the substrate body 29, the first curved surface 510 concave toward the side opposite to the electro-optical layer 80 is provided. The first lens layer 61 covers the first curved surface 510, and the second curved surface 520 concave toward the side opposite to the electro-optical layer 80 is provided in the surface on the electro-optical layer 80 side. The second lens layer 62 covers the second curved surface 520, and includes the flat surface 620 on the electro-optical layer 80 side. The third lens layer 63 overlaps the second lens layer 62. The third lens layer 63 includes the third curved surface 530 on the electro-optical layer 80 side. In the present exemplary embodiment, the third curved surface 530 is a concave curved surface concave toward the substrate body 29. The fourth lens layer 64 covers the third curved surface 530, and includes the flat surface 640 on the electro-optical layer 80 side. In the present exemplary embodiment, between the second lens layer 62 and the third lens layer 63, the light shielding layer 27 including the partition 27a and the light shielding layer 27b for alignment is provided.

Here, the refractive indexes of the substrate body 29, the first lens layer 61, the second lens layer 62, the third lens layer 63, and the fourth lens layer 64 satisfy the following conditions.

the substrate body 29<the first lens layer 61
the first lens layer 61>the second lens layer 62
the third lens layer 63<the fourth lens layer 64

Specifically, the first lens layer 61 is greater in refractive index than the substrate body 29. The first lens layer 61 is greater in refractive index than the second lens layer 62. The fourth lens layer 64 is greater in refractive index than the third lens layer 63. Therefore, the lens surfaces 51 and 53 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the second substrate 20 side is converged by the two lens surfaces 51 and 53. When the illumination light enters the first substrate 10, light toward the light shielding member 18 can be guided efficiently to the light transmission area 180. Thus, an effect similar to that in Exemplary Embodiment 2 can be exerted. Further, in a case where the third curved surface 530 is a concave curved surface concave toward the substrate body 29, even when the surface of the fourth lens layer 64 is excessively polished during flattening, the lens surface 53 is less likely to be damaged. Thus, the fourth lens layer 64 can be reduced in thickness. Note that, when the fifth lens layer 65 is provided as in Exemplary Embodiment 1, the third curved surface 530 is a concave curved surface concave toward the substrate body 29. In this case, even when the surface of the fifth lens layer 65 is excessively polished during flattening, the lens surface 54 is less likely to be damaged. Thus, the fifth lens layer 65 can be reduced in thickness.

Exemplary Embodiment 4

Figure 8:
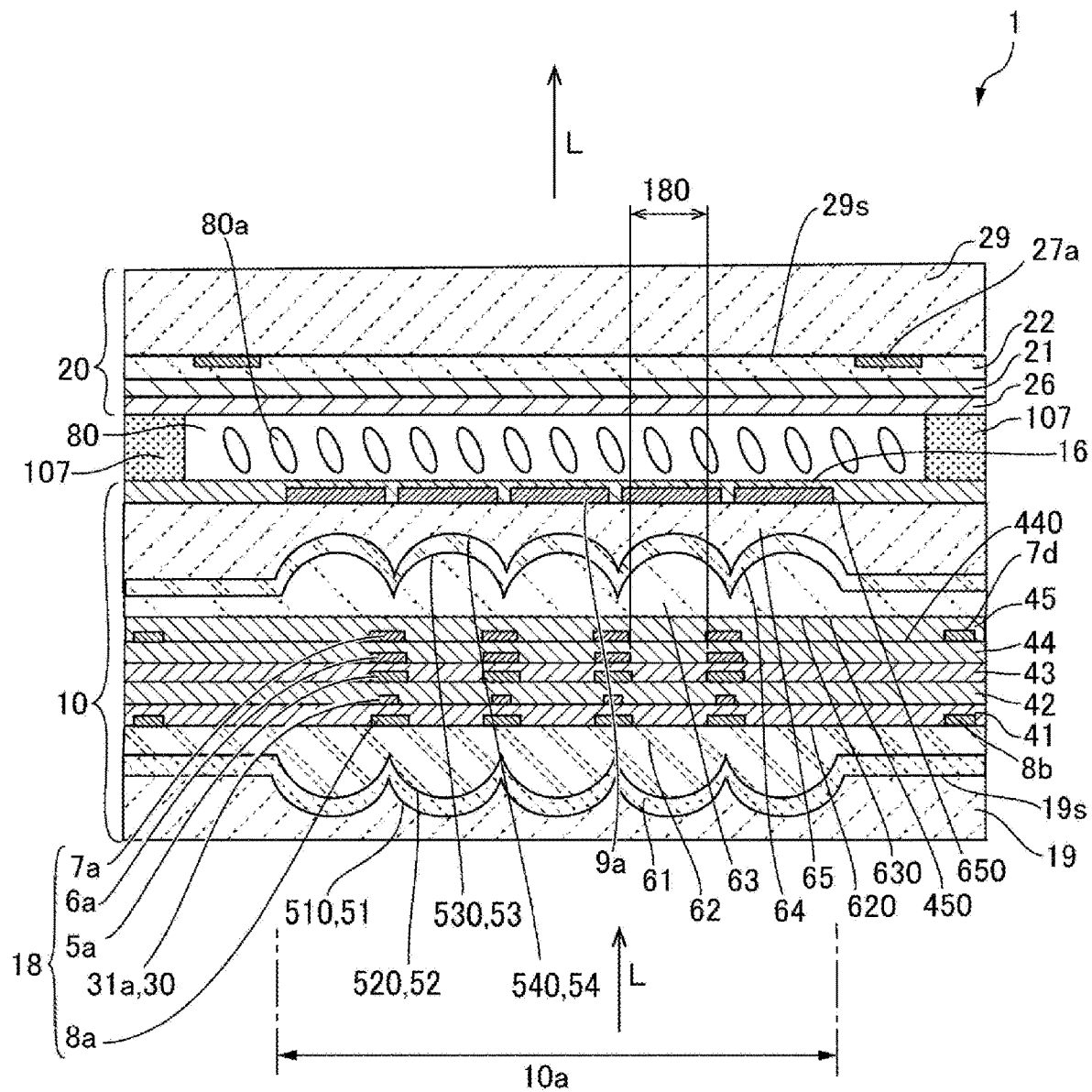
FIG. 8 is an explanatory view of an electro-optical device according to Exemplary Embodiment 4 of the present disclosure.

FIG. 8 is an explanatory view of the electro-optical device 1 according to Exemplary Embodiment 4 of the present disclosure. In Exemplary Embodiments 1 to 3, the lens surface is provided in the second substrate 20. In the present exemplary embodiment, as illustrated in FIG. 8, in the display region 10a, the four lens surfaces 51, 52, 53, and 54 are formed in the first substrate 10 in such a way to overlap each other in plan view, and each of the four lens surfaces 51, 52, 53, and 54 overlaps the pixel electrode 9a in plan view.

More specifically, as illustrated in FIG. 8, in the first substrate 10, between the substrate body 19 and the light shielding member 18, the first lens layer 61 and the second lens layer 62 are sequentially formed from the substrate body 19 side to the light shielding member 18 side. Between the light shielding member 18 and the pixel electrode 9a, the third lens layer 63, the fourth lens layer 64, and the fifth lens layer 65 are sequentially formed from the light shielding member 18 to the electro-optical layer 80 side. In the present exemplary embodiment, the second substrate 20 is not provided with a lens layer, and hence a protective layer 22 is provided between the partition 27a and the common electrode 21.

At a position overlapping the pixel electrode 9a in plan view in the one surface 19s of the substrate body 19, the first curved surface 510 concave toward a side opposite to the electro-optical layer 80 is provided. The first lens layer 61 covers the first curved surface 510, and the second curved surface 520 concave toward the side opposite to the electro-optical layer 80 is provided in the surface on the electro-optical layer 80 side. The second curved surface 520 is a concave portion to which the shape of the first curved surface 510 is reflected when the first lens layer 61 is formed. The second lens layer 62 covers the second curved surface 520, and includes the flat surface 620 on the electro-optical layer 80 side. The flat surface 620 is formed by subjecting the second lens layer 62 to the CMP processing or the like.

The third lens layer 63 is provided on the pixel electrode 9a side with respect to the second lens layer 62. More specifically, the third lens layer 63 is layered on a flat surface 450 of the inter-layer insulating film 45 on the electro-optical layer 80 side, and a surface of the third lens layer 63 on a side opposite to the electro-optical layer 80 is the flat surface 630. The third lens layer 63 includes the third curved surface 530, which overlaps the pixel electrode 9a in plan view, on the electro-optical layer 80 side. In the present exemplary embodiment, the third curved surface 530 is a convex curved surface protruding to the electro-optical layer 80 side. The fourth lens layer 64 covers the third curved surface 530, and the fourth curved surface 540 protruding to the electro-optical layer 80 side is provided at a surface on the electro-optical layer 80 side. The fourth curved surface 540 is a convex portion to which the shape of the third curved surface 530 is reflected when the fourth lens layer 64 is formed. The fifth lens layer 65 covers the fourth curved surface 540, and includes the flat surface 650 on the electro-optical layer 80 side. The flat surface 650 is formed by subjecting the fifth lens layer 65 to the CMP processing or the like.

Similarly to Exemplary Embodiment 1, in the present exemplary embodiment, the substrate body 19 and the first lens layer 61 are different in refractive index, the first lens layer 61 and the second lens layer 62 are different in refractive index, the third lens layer 63 and the fourth lens layer 64 are different in refractive index, and the fourth lens layer 64 and the fifth lens layer 65 are different in refractive index. Therefore, the first curved surface 510, the second curved surface 520, the third curved surface 530, and the fourth curved surface 540 constitute the lens surfaces 51, 52, 53, and 54, respectively.

In the present exemplary embodiment, the refractive indexes of the substrate body 19, the first lens layer 61, the second lens layer 62, the third lens layer 63, and the fourth lens layer 64 satisfy the following conditions.

the substrate body 19<the first lens layer 61
the first lens layer 61>the second lens layer 62
the third lens layer 63>the fourth lens layer 64>the fifth lens layer 65

Specifically, the first lens layer 61 is greater in refractive index than the substrate body 19. The first lens layer 61 is greater in refractive index than the second lens layer 62. The third lens layer 63 is greater in refractive index than the fourth lens layer 64. The fourth lens layer 64 is greater in refractive index than the fifth lens layer 65. Therefore, the lens surfaces 51, 53, and 54 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the first substrate 10 is converged by the lens surface 51 having a positive power. Thus, light toward the light shielding member 18 can be guided efficiently to the light transmission area 180. Thus, an amount of light emitted from the electro-optical device 1 can be increased, and hence a bright image can be displayed. Further, between the light shielding member 18 in a lattice shape and the pixel electrode 9a, the lens surfaces 52 and 53 having a positive power are provided. Thus, tilt of a light beam emitted from the electro-optical device 1 can be optimized by the lens surfaces 52 and 53. Therefore, when the electro-optical device 1 is used as a light valve of a projection-type display apparatus described later, vignetting due to a projection optical system can be suppressed. Thus, a bright image with high quality can be displayed. Further, illumination light is converged by the lens surfaces 51, 53, and 54. Thus, there is no need to provide a thick optical path length adjustment layer that is referred to as a path layer for adjusting an optical path length in the first substrate 10. Therefore, the total thickness of the lens layer in the first substrate 10 can be set to 20 μm or smaller, for example. Therefore, a time period required for forming a film can be shortened, and hence productivity can be improved.

Further, the lens surface 52 has a negative power, and hence a situation in which illumination light focuses on the electro-optical layer 80 or the like can be avoided.

Further, the first lens layer 61 is provided in conformity with the shape of the first curved surface 510 of the substrate body 29, and thus the lens surface 52 is formed between the first lens layer 61 and the second lens layer 62. The fourth lens layer 64 is provided in conformity with the shape of the third curved surface 530 of the third lens layer 63, and thus the lens surface 54 is formed between the third lens layer 63 and the fourth lens layer 64. In this regard, the thicknesses of the first lens layer 61 and the fourth lens layer 64 can be reduced. Therefore, a time period required for forming a film can be shortened, and hence productivity can be improved.

In the present exemplary embodiment, the second lens layer 62 includes the flat surface 620 on the electro-optical layer 80 side. Thus, between the second lens layer 62 and the third lens layer 63, light shielding members 7d and 8b for alignment are provided outside the display region 10a. More specifically, on the flat surface 620 of the second lens layer 62 on the electro-optical layer 80, the light shielding member 8b, which is formed of the same conductive film as the light shielding layer 8a, is provided. The light shielding layer 8a and the light shielding member 8b are held in contact with the flat surface 620. Further, on a flat surface 440 of the inter-layer insulating film 44 on the electro-optical layer 80, the light shielding member 7d, which is formed of the same conductive film as the light shielding layer 7a, is provided. The light shielding layer 7a and the light shielding member 7d are held in contact with the flat surface 440. Therefore, in a process of forming the respective wiring lines, when a photoresist is exposed with light through use of a photolithography technique, an exposure mask can be positioned with the light shielding member 8b for alignment as a reference. Therefore, in a process of forming the third curved surface 530, when a photoresist is exposed with light through use of a photolithography technique, an exposure mask can be positioned with the light shielding member 7d for alignment as a reference.

Modified Example 1 of Exemplary Embodiment 4

The substrate body 19, the first lens layer 61, the second lens layer 62, the third lens layer 63, the fourth lens layer 64, and the fifth lens layer 65 may satisfy the following conditions, for example. In this case, the third curved surface 530 constitutes a lens having a negative power.

the substrate body 19<the first lens layer 61
the first lens layer 61>the second lens layer 62
the third lens layer 63<the fourth lens layer 64
the fourth lens layer 64>the fifth lens layer 65

Exemplary Embodiment 5

Figure 9:
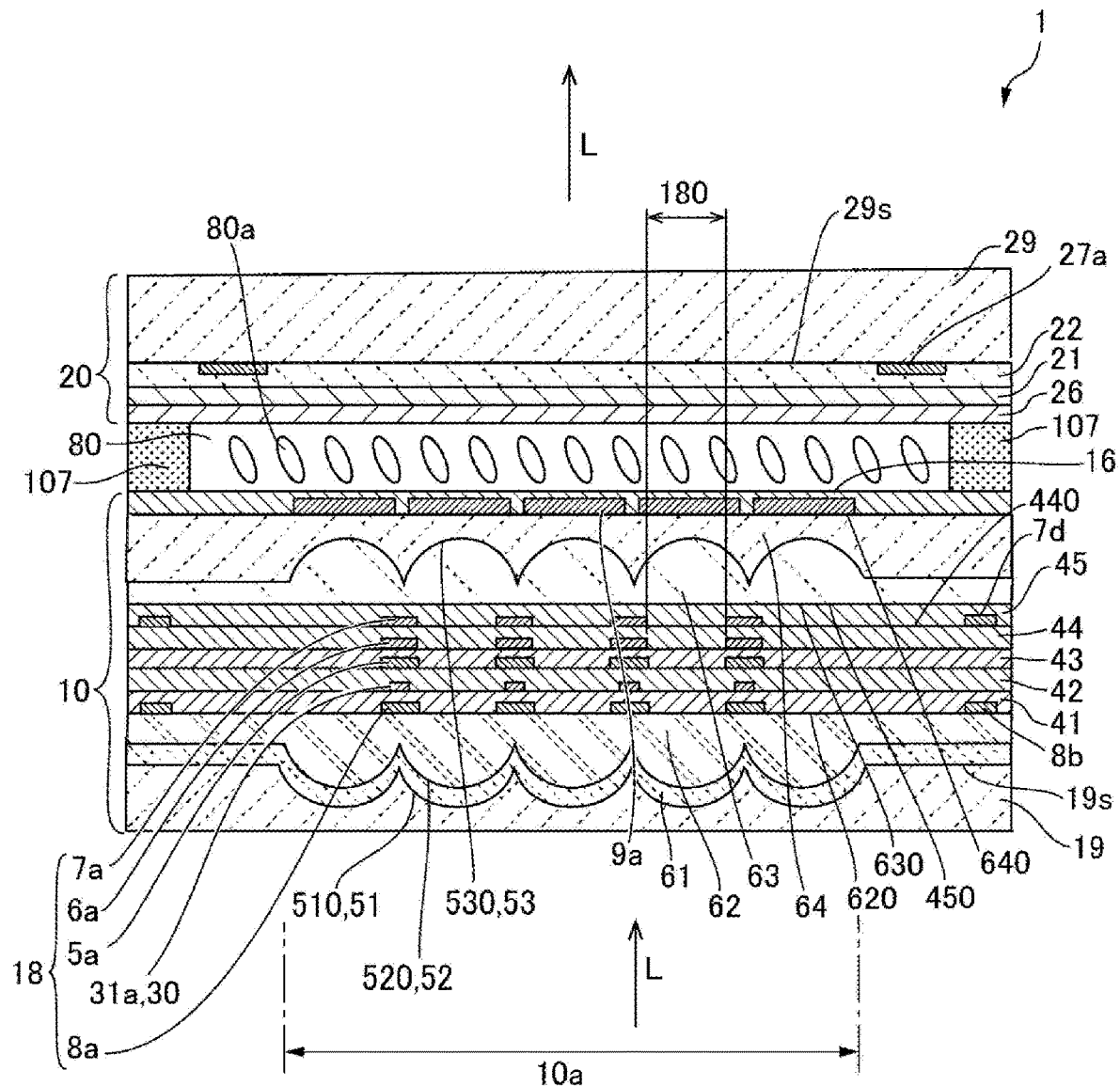
FIG. 9 is an explanatory view of an electro-optical device according to Exemplary Embodiment 5 of the present disclosure.

FIG. 9 is an explanatory view of the electro-optical device 1 according to Exemplary Embodiment 5 of the present disclosure. In Exemplary Embodiment 1, the five lens layers constitute the four lens surfaces. In the present exemplary embodiment, as described below, four lens layers constitute three lens surfaces. Specifically, as illustrated in FIG. 8, in the first substrate 10, in the one surface 19s side of the substrate body 19, the first lens layer 61, the second lens layer 62, the third lens layer 63, and the fourth lens layer 64 are sequentially provided from the substrate body 19 side to the electro-optical layer 80 side.

Further, in the one surface 19s of the substrate body 19, the first curved surface 510 concave toward the side opposite to the electro-optical layer 80 is provided. The first lens layer 61 covers the first curved surface 510, and the second curved surface 520 concave toward the side opposite to the electro-optical layer 80 is provided in the surface on the electro-optical layer 80 side. The second lens layer 62 covers the second curved surface 520, and includes the flat surface 620 on the electro-optical layer 80 side. The third lens layer 63 includes the third curved surface 530 on the electro-optical layer 80 side. In the present exemplary embodiment, the third curved surface 530 is a convex curved surface protruding to the electro-optical layer 80 side. The fourth lens layer 64 covers the third curved surface 530, and includes the flat surface 640 on the electro-optical layer 80 side. The flat surface 620 is formed by subjecting the second lens layer 62 to the CMP processing or the like, and the flat surface 640 is formed by subjecting the fourth lens layer 64 to the CMP processing or the like. In the present exemplary embodiment, on the flat surface 620 of the second lens layer 62 on the electro-optical layer 80 side, the light shielding layer 8a is provided. Further, on the flat surface 440 of the inter-layer insulating film 44 on the electro-optical layer 80, the light shielding member 7d is provided. Therefore, between the second lens layer 62 and the third lens layer 63, the light shielding members 18, 7d, and 8b are provided.

Here, the refractive indexes of the substrate body 29, the first lens layer 61, the second lens layer 62, the third lens layer 63, and the fourth lens layer 64 satisfy the following conditions.

the substrate body 19<the first lens layer 61
the first lens layer 61>the second lens layer 62
the third lens layer 63>the fourth lens layer 64

Specifically, the first lens layer 61 is greater in refractive index than the substrate body 19. The first lens layer 61 is greater in refractive index than the second lens layer 62. The third lens layer 63 is greater in refractive index than the fourth lens layer 64. Therefore, the lens surfaces 51 and 53 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the first substrate 10 is converged by the lens surface 51 having a positive power. Thus, light toward the light shielding member 18 can be guided efficiently to the light transmission area 180. Thus, an amount of light emitted from the electro-optical device 1 can be increased, and hence a bright image can be displayed. Further, between the light shielding member 18 in a lattice shape and the pixel electrode 9a, the lens surface 53 having a positive power is provided. Thus, tilt of a light beam emitted from the electro-optical device 1 can be optimized by the lens surface 53. Thus, an effect similar to that in Exemplary Embodiment 4 can be exerted.

Exemplary Embodiment 6

Figure 10:
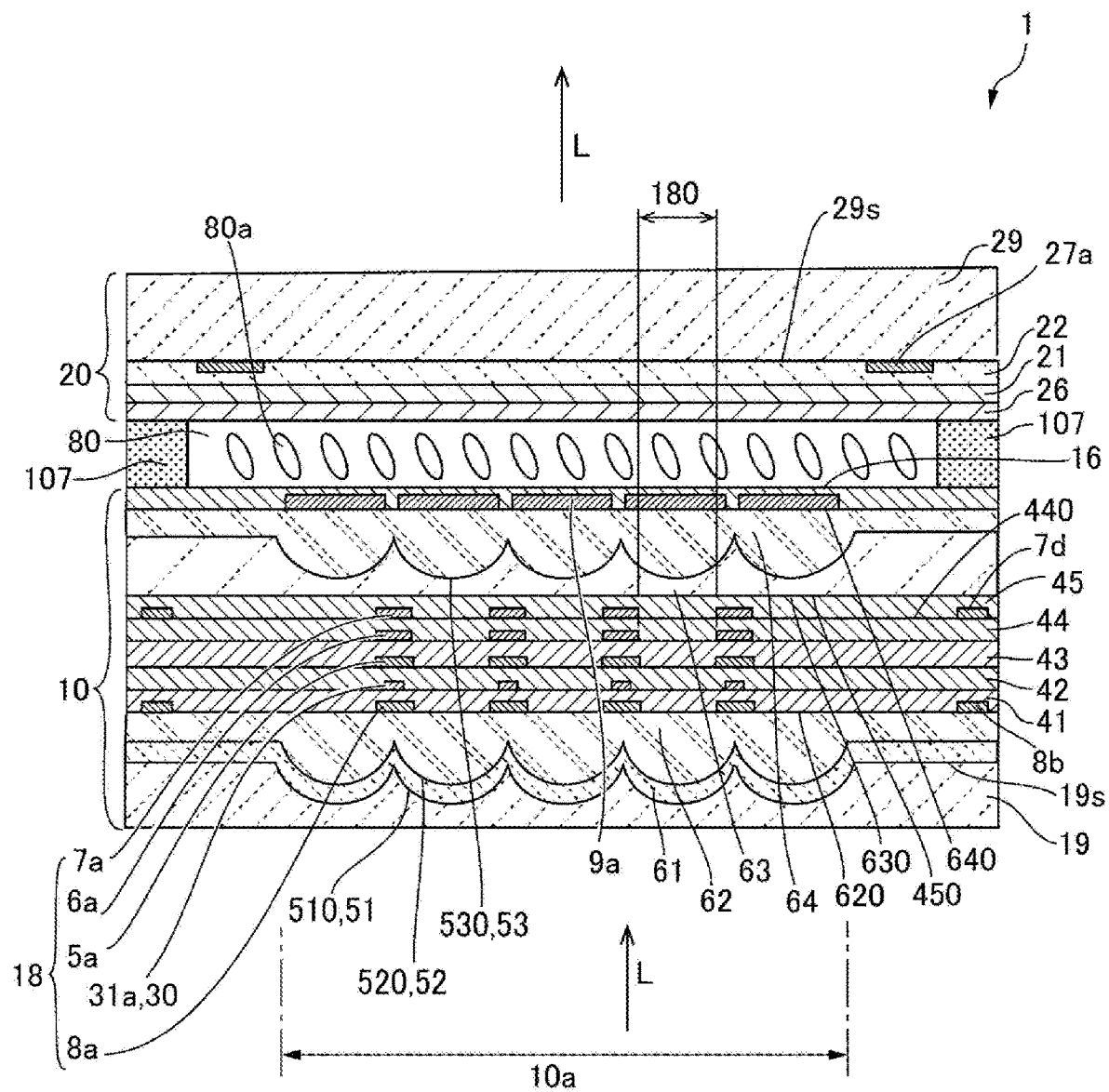
FIG. 10 is an explanatory view of an electro-optical device according to Exemplary Embodiment 6 of the present disclosure.

FIG. 10 is an explanatory view of the electro-optical device 1 according to Exemplary Embodiment 6 of the present disclosure. In Exemplary Embodiment 5, the third curved surface 530 is a convex curved surface protruding to the electro-optical layer 80. In the present exemplary embodiment, as illustrated in FIG. 10, the third curved surface 530 is a concave curved surface concave toward the substrate body 19. More specifically, as illustrated in FIG. 10, in the first substrate 10, in the one surface 19s side of the substrate body 19, the first lens layer 61, the second lens layer 62, the third lens layer 63, and the fourth lens layer 64 are sequentially provided from the substrate body 29 side to the electro-optical layer 80 side.

Further, in the one surface 19s of the substrate body 19, the first curved surface 510 concave toward the side opposite to the electro-optical layer 80 is provided. The first lens layer 61 covers the first curved surface 510, and the second curved surface 520 concave toward the side opposite to the electro-optical layer 80 is provided in the surface on the electro-optical layer 80 side. The second lens layer 62 covers the second curved surface 520, and includes the flat surface 620 on the electro-optical layer 80 side. The third lens layer 63 includes the third curved surface 530 on the electro-optical layer 80 side. In the present exemplary embodiment, the third curved surface 530 is a concave curved surface concave toward the substrate body 19. The fourth lens layer 64 covers the third curved surface 530, and includes the flat surface 640 on the electro-optical layer 80 side. In the present exemplary embodiment, between the second lens layer 62 and the third lens layer 63, the light shielding members 18, 7d, and 8b are provided.

Here, the refractive indexes of the substrate body 29, the first lens layer 61, the second lens layer 62, the third lens layer 63, and the fourth lens layer 64 satisfy the following conditions.

the substrate body 19<the first lens layer 61
the first lens layer 61>the second lens layer 62
the third lens layer 63<the fourth lens layer 64

Specifically, the first lens layer 61 is greater in refractive index than the substrate body 19. The first lens layer 61 is greater in refractive index than the second lens layer 62. The fourth lens layer 64 is greater in refractive index than the third lens layer 63. Therefore, the lens surfaces 51 and 53 each constitute a lens having a positive power for converging light, and the lens surface 52 constitutes a lens having a negative power for dispersing light.

The second lens layer 62 and the third lens layer 63 may have equivalent refractive indexes or may have refractive indexes different from each other. In the present exemplary embodiment, the third lens layer 63 is greater in refractive index than the second lens layer 62.

According to this configuration, incident illumination light from the first substrate 10 is converged by the lens surface 51 having a positive power. Thus, light toward the light shielding member 18 can be guided efficiently to the light transmission area 180. Thus, an amount of light emitted from the electro-optical device 1 can be increased, and hence a bright image can be displayed. Further, between the light shielding member 18 in a lattice shape and the pixel electrode 9a, the lens surface 53 having a positive power is provided. Thus, tilt of a light beam emitted from the electro-optical device 1 can be optimized by the lens surface 53. Thus, an effect similar to that in Exemplary Embodiment 4 can be exerted. Further, the third curved surface 530 is a concave curved surface concave toward the substrate body 19. Thus, even when the surface of the fourth lens layer 64 is excessively polished during flattening, the lens surface 53 is less likely to be damaged. As a result, the fourth lens layer 64 can be reduced in thickness. Therefore, the pixel electrode 9a is electrically couped to the bottom layer side easily via the contact hole. Note that, when the fifth lens layer 65 is provided as in Exemplary Embodiment 4, the third curved surface 530 is a concave curved surface concave toward the substrate body 19. In this case, even when the surface of the fifth lens layer 65 is excessively polished during flattening, the lens surface 54 is less likely to be damaged. Thus, the fifth lens layer 65 can be reduced in thickness. Therefore, the pixel electrode 9a is electrically couped to the bottom layer side easily via the contact hole.

Other Exemplary Embodiments

In the above exemplary embodiments, the present disclosure is applied to an electro-optical device employing a VA mode, but may be applied to an electro-optical device employing a TN mode, an IPS mode, an FFS mode, or an OCB mode.

Installation Example to Electronic Apparatus

Figure 11:
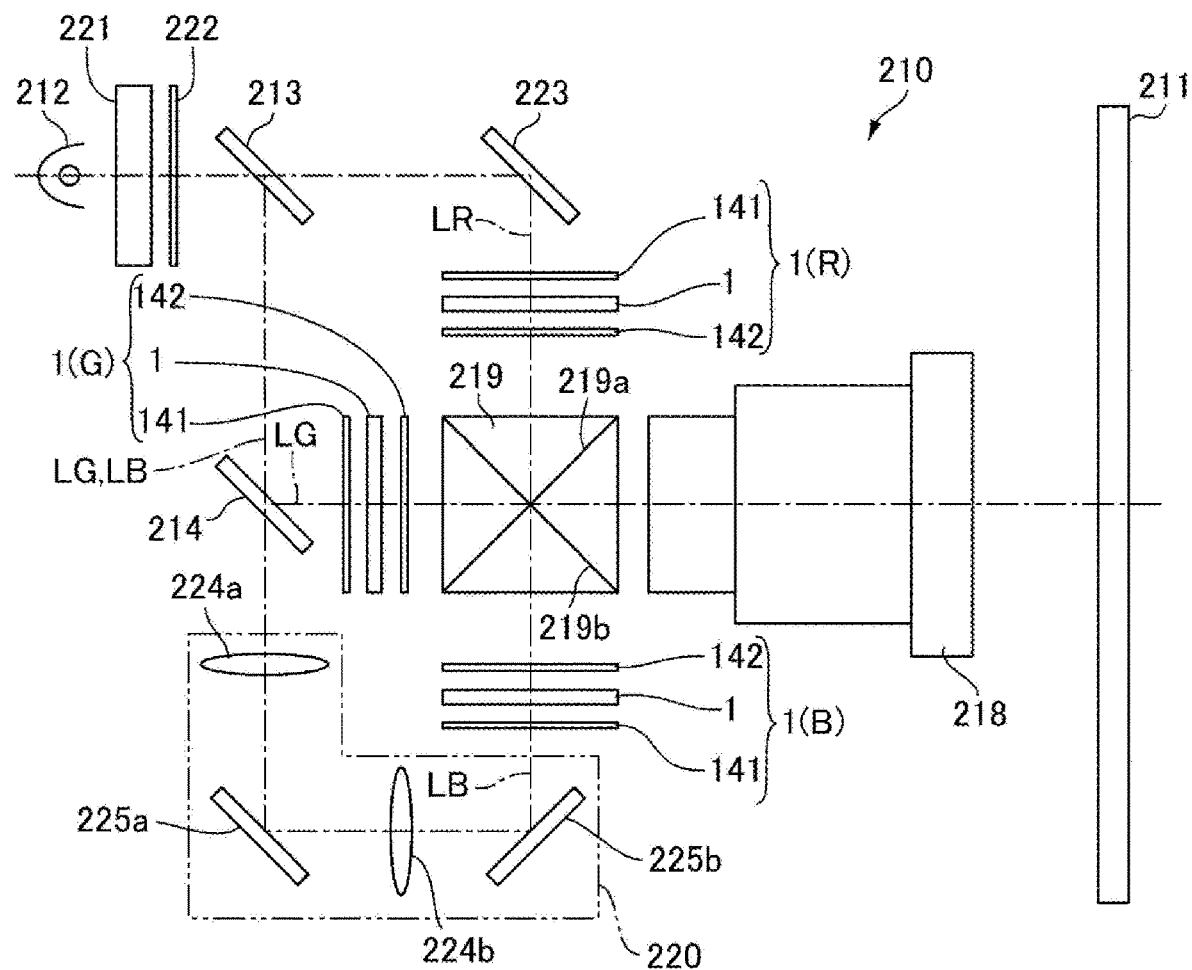
FIG. 11 is a schematic configuration view of a projection-type display apparatus using the electro-optical device to which the present disclosure is applied.

FIG. 11 is a schematic configuration view of a projection-type display apparatus using the electro-optical device 1 to which the present disclosure is applied. Note that, in the following description, a plurality of light valves (a red light valve 1(R), a green light valve 1(G), and a blue light valve 1(B)) are used. The electro-optical device 1 to which the present disclosure is applied is used in all the light valves. In this case, a first polarizing plate 141 and a second polarizing plate 142 are arranged in a crossed-Nicols state with respect to the electro-optical device 1.

A projection-type display apparatus 210 illustrated in FIG. 11 is a forward projection type projector that projects an image on a screen 211 provided in front of the projector. The projection-type display apparatus 210 includes a light source unit 212, dichroic mirrors 213 and 214, the three light valves (the red light valve 1(R), the green light valve 1(G), and the blue light valve 1(B)), a projection optical system 218, a cross dichroic prism 219, and a relay system 230.

The light source unit 212 is formed of an extra-high-pressure mercury lamp for supplying light source light including red light, green light, and blue light, for example. The dichroic mirror 213 has a structure of causing read light LR from the light source unit 212 to pass therethrough and reflecting green light LG and blue light LB. Further, the dichroic mirror 214 has a structure of causing, of the green light LG and the blue light LB reflected by the dichroic mirror 213, the blue light LB to pass therethrough and reflecting the green light LG. In this way, the dichroic mirrors 213 and 214 constitute a color separation optical system that separates light, which is emitted from the light source unit 212, into the red light LR, the green light LG, and the blue light LB. An integrator 221 and a polarization conversion element 222 are sequentially arranged, between the dichroic mirror 213 and the light source unit 212, from the light source unit 212. The integrator 221 equalizes the illuminance distribution of the light radiated from the light source unit 212. The polarization conversion element 222 converts the light from the light source unit 212 into linearly polarized light having a specific vibration direction such as s-polarized light.

The red light valve 1(R) modulates the red light LR (illumination light) having passed through the dichroic mirror 213 and being reflected by a reflection mirror 223 in accordance with an image signal, and emits the modulated red light LR (modulated light) toward the cross dichroic prism 219.

The green light valve 1(G) modulates the green light LG (illumination light) having been reflected by the dichroic mirror 213 and then being reflected by the dichroic mirror 214 in accordance with an image signal, and emits the modulated green light LG (modulated light) toward the cross dichroic prism 219.

The blue light valve 1(B) modulates the green light LB (illumination light) having been reflected by the dichroic mirror 213, passed through the dichroic mirror 214, and then passed through the relay system 230, in accordance with an image signal, and emits the modulated green light LB (modulated light) toward the cross dichroic prism 219.

The relay system 230 includes relay micro lenses 224a and 224b and reflection mirrors 225a and 225b. The relay micro lenses 224a and 224b are provided to prevent the loss of light due to the long optical path of the blue light LB. The relay micro lens 224a is arranged between the dichroic mirror 214 and the reflection mirror 225a.

The relay micro lens 224b is arranged between the reflection mirrors 225a and 225b. The reflection mirror 225a is arranged to reflect, toward the relay micro lens 224b, the blue light LB having passed through the dichroic mirror 214 and then been emitted from the relay micro lens 224a. The reflection mirror 225b is arranged to reflect the blue light LB having been emitted from the relay micro lens 224b toward the blue light valve 1(B).

The cross dichroic prism 219 serves as a color combining optical system in which two dichroic films 219a and 219b are orthogonally arranged in an X shape. The dichroic film 219a reflects the blue light LB and transmits the green light LG. The dichroic film 219b reflects the red light LR and transmits the green light LG.

Accordingly, the cross dichroic prism 219 synthesizes the red light LR, the green light LG, and the blue light LB modulated by the red light valve 1(R), the green light valve 1(G), and the blue light valve 1(B), respectively, and emits the synthesized light toward the projection optical system 218. The projection optical system 218 includes a projection micro lens (not illustrated), and projects the light, which is synthesized by the cross dichroic prism 219, onto the screen 211.

Other Electronic Apparatuses

In the projection-type display apparatus, the electro-optical device 1 to which the present disclosure is applied may use, as a light source unit, an LED light source, a laser light source, or the like that emit light in various colors, and may supply each colored light emitted from the light source to separate electro-optical devices.

Further, in addition to a forward projection type projector that projects a projection image from an observation side, the electro-optical device 1 may be used in a rearward projection type projector that projects a projection image from a side opposite to an observation side.

Further, the electronic apparatus to which the electro-optical device 1 is applicable is not limited to the projection-type display apparatus 210. For example, the electro-optical device 1 may be used as a projection-type head-up display (HUD), a direct viewing-type head-mounted display (HMD), and a display unit of an information terminal device such as an electronic book, a personal computer, a digital camera, a liquid crystal television, a view finder-type or a monitor direct viewing type video recorder, a car navigation system, an electronic note book, and POS.

What is claimed is:

1. An electro-optical device, comprising:
a pair of substrates; and
an electro-optical layer arranged between the pair of substrates, wherein
one substrate of the pair of substrates includes a substrate body including a first curved surface concave toward a side opposite to the electro-optical layer, a first lens layer covering the first curved surface and including a second curved surface concave toward a side opposite to the electro-optical layer, the second curved surface being provided at a surface on a side of the electro-optical layer, a second lens layer covering the second curved surface and including a flat surface on a side of the electro-optical layer, a third lens layer being provided on a side of the electro-optical layer with respect to the flat surface of the second lens layer and including a third curved surface at a surface on a side of the electro-optical layer, a fourth lens layer covering the third curved surface from a side of the electro-optical layer, and a light shielding member provided between the second lens layer and the third lens layer,
the second lens layer and the third lens layer are in direct contact with each other,
the substrate body and the first lens layer are different in refractive index,
the first lens layer and the second lens layer are different in refractive index, and
the third lens layer and the fourth lens layer are different in refractive index.

2. The electro-optical device according to claim 1, wherein
each of the first curved surface and the third curved surface constitutes a lens having a positive power.

3. The electro-optical device according to claim 1, wherein
the fourth lens layer includes a fourth curved surface at a surface on a side of the electro-optical layer,
a fifth lens layer is provided on a side of the electro-optical layer with respect to the fourth lens layer, the fifth lens layer covering the fourth curved surface and including a flat surface on a side of the electro-optical layer, and
each of the third curved surface and the fourth curved surface is a convex curved surface protruding to a side of the electro-optical layer or a concave curved surface concave toward a side of the substrate body.

4. The electro-optical device according to claim 1, wherein
the third curved surface is a concave curved surface concave toward a side of the substrate body.

5. The electro-optical device according to claim 1, wherein
- another substrate of the pair of substrates is provided with a pixel electrode, and
- the one substrate is provided with a common electrode.

6. The electro-optical device according to claim 1, wherein
- the one substrate is provided with a pixel electrode, and
- the other substrate of the pair of substrates is provided with a common electrode.

7. An electronic apparatus, comprising:
the electro-optical device according to claim 1.

8. The electronic apparatus according to claim 7 comprising:
- a light source unit configured to emit illumination light entering the electro-optical device; and
- a projection optical system configured to project modulated light emitted from the electro-optical device.

9. The electro-optical device according to claim 1, wherein
- the third lens layer and the fourth lens layer are in direct contact with each other.

* * * * *